May 24, 1955

E. M. LAUCK 2,708,872

DENSITY CONTROL FOR HAY PRESSES

Filed Sept. 6, 1949

INVENTOR.
ERNEST M. LAUCK
BY
*Huebner, Beehler,*
*Worrel, Herzig & Caldwell*
ATTORNEYS May 24, 1955  E. M. LAUCK  2,708,872
DENSITY CONTROL FOR HAY PRESSES
Filed Sept. 6, 1949  4 Sheets-Sheet 2

INVENTOR.
ERNEST M. LAUCK
BY Huebner, Beehler,
Worrel, Herzig & Caldwell
ATTORNEYS May 24, 1955

E. M. LAUCK 2,708,872

DENSITY CONTROL FOR HAY PRESSES

Filed Sept. 6, 1949

INVENTOR.
ERNEST M. LAUCK
BY
ATTORNEYS

May 24, 1955 E. M. LAUCK 2,708,872
DENSITY CONTROL FOR HAY PRESSES
Filed Sept. 6, 1949 4 Sheets-Sheet 4

INVENTOR
ERNEST M. LAUCK
BY
ATTORNEYS

United States Patent Office 2,708,872
Patented May 24, 1955

2,708,872

DENSITY CONTROL FOR HAY PRESSES

Ernest M. Lauck, Fresno, Calif.

Application September 6, 1949, Serial No. 114,261

7 Claims. (Cl. 100—43)

The present invention relates generally to hay presses and more particularly to an improved mechanism for automatically controlling the density of hay and the like compressed thereby.

In the operation of hay balers for forming bales of hay, straw and the like, it has heretofore been difficult to maintain proper baling conditions whereby bales of uniform density are obtained. Baling conditions change constantly due to the varying moisture content and quality of hay at various locations. It has heretofore been necessary to have an operator constantly observe and adjust the operation of the baler to form bales of uniform density. Such regulation has been subject to human errors of judgment, under control as well as over control, generally lagging correction because of anticipatory difficulties, and the obvious waste incident to the employment of an extra operator where control of any acceptable degree of accuracy is to be achieved.

Many prior art or conventional balers check the density of the bales after they are tied so that the operator may adjust the density of subsequent bales. Because of constantly varying baling conditions, corrections based upon preceding hay conditions frequently increase baling inaccuracies rather than accomplishing their intended purposes.

It has been known to detect density of baled hay by thrusting a feeler head into the compressed hay and promptly retracting the same. This compression detection is subject to all of the inaccuracies of generalization on the basis of intermittent sampling. When such feeler heads strike heavy stalks, weed stems, or sticks in the hay, an entirely erroneous impression of the hay density is formulated, and where automatic density control is effected from such sampling, errors of great magnitude result. A continuous averaging detection has long been needed in baling operations but to the applicant's knowledge has not heretofore been available.

In view of the foregoing disadvantages and shortcomings of conventional balers, it is an object of the present invention to provide an improved hay baler in which the density of bales formed thereby is substantially uniform.

Another object is to provide a control for a baler automatically and continuously adjusting the baler to varied hay quality, moisture content, and the like.

Another object is to provide a baler in which the cost of the baling operation is considerably reduced in that the necessity for an extra operator to evaluate changing hay conditions and regulate the baler is obviated.

Another object is to provide a baler in which the density of a bale of hay being formed is regulated to conform to a predetermined standard by continuous detection of the degree of hay compression of hay rammed into the bale.

Another object is to provide a baler in which the compression plates thereof are positively and automatically positioned to offer substantially constant resistance to hay rammed thereagainst.

Another object is to provide a baling control of the character described that is economical to manufacture, simply installed on existing or newly produced balers, durable in design and construction, dependable in its operation, and adapted to regulate bale uniformity in an efficacious manner.

Still further objects and advantages will become apparent in the subsequent description in the specification.

In the drawings:

Fig. 8 can be visualized as a view of the control arm and blade as they would appear detached from their positions shown in Fig. 3 and with the blade rolled slightly toward the observer.

Figure 1:
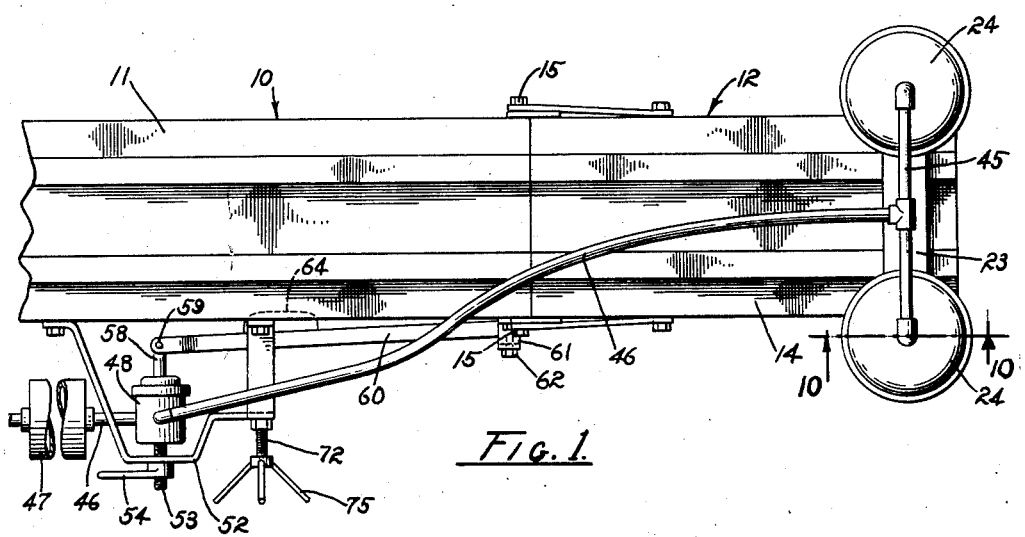
Fig. 1 is a fragmentary top plan view of the delivery portion of a hay baler showing the construction of my invention incorporated therewith.
Figure 2:
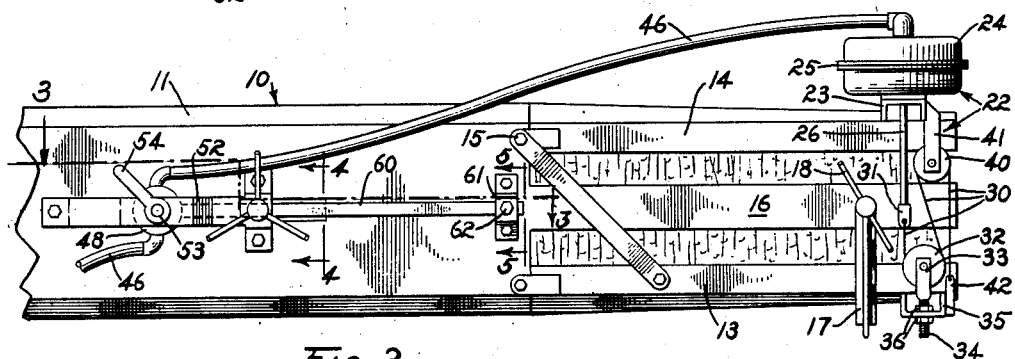
Fig. 2 is a forward elevational view of the structure illustrated in Fig. 1.

Referring in greater detail to the drawings:

The hay baling control of the present invention is illustrated and described in connection with the delivery portion of a baler 10 provided with an elongated hollow rectangular tubular bale case or chamber 11. The bale case has a bale case extension 12 attached to and extending in longitudinal alignment therefrom. The bale case extension has a bottom 13 of channel form attached rigidly to a lower portion of the bale case 11 adapted to support tied bales of hay slidably thereon. The bale case 12 is also provided with a top member 14 of inverted channel form which is located directly above and in juxtaposition with the bottom 13. The top member is hinged or pivoted at 15 to the upper outer edge of the bale case 11 for convergent-divergent positioning relative to the bottom 13. This top member 14 in effect functions as a compression plate being adjustably movable relative to the rigid bottom to impede the movement of a completed bale of hay therebetween which is employed as a ramming back against which hay is rammed in the formation of succeeding bales.

An elongated rectangular sheet metal resistor plate 16 is either pivotally or flexibly attached to the rear edge of each side of the bale case 11 and extended in substantial alignment therewith. These resistor plates are adapted to be adjustably positioned in predetermined spaced relation to offer base resistance to bale movement therebetween. A U-shaped bracket clamp 17 makes engagement with the outer sides of the pair of resistor plates. A T handle operated vise means 18 is provided whereby the U clamp adjustably maintains the resistor plates in predetermined spaced relation. The foregoing described structure is more or less of conventional design, the baling control of the presnt invention being applied thereto for automatically regulating the relationship of the top member or compression plate 14 to the stationary bottom member 13 of the bale case to impose a constantly regulated control-impediment upon bales against which new bales are rammed as superimposed upon the base impediment resulting from predetermined positioning of the resistor plates. The device of the present invention may be employed in other bale resistance mechanisms without departing from the spirit or scope of the invention.

The means for regulating the spaced relationship of the compression plate 14 and the stationary bottom 13 conveniently takes the form of a power control indicated generally by the reference numeral 22. A channel iron member 23 is weldably or otherwise attached transversely against the upper side of the compression plate 14 and extends laterally therefrom to each side. A vacuum-responsive actuator 24 is mounted on each end of the channel iron 23 in an axially vertical position.

The actuators conveniently employ generally cylindrical portions assembled in coaxial alignment to form a housing. A diaphragm is mounted between the portions, as at 25. As will subsequently become apparent, the upper of each of the two portions has the pressure therein controlled in response to density of compressed hay and the lower of the two portions is open to atmospheric pressure. A control rod 26 is connected centrally of the diaphragm, slidably mounted in the lower portion of each of the actuators 24, and extended downwardly adjacent to the side of the bale case extension 12.

The control linkage for the actuator 24 at each opposite side of the bale case extension 12 is identical and, for purposes of brevity, the linkage at one side only is further described. A flexible cable 30 is securely attached at one of its ends to a head 31 secured to the lower end of the control rod 26. The cable passes downwardly therefrom and about a pulley 32 which is rotatably mounted in a yoke 33 having a screw portion 34 extending through a channel member 35 rigidly mounted transversely below the bottom 13 and adjustably maintained by a pair of nuts 36 on the screw 34 engaging opposite surfaces of the channel member. The channel 35 is secured transversely against the under side of the stationary bottom member 13 of the bale case extension and extends laterally therefrom for the attachment of the yokes 33 at each opposite end thereof.

After passing partially around the pulley 32, the cable 30 extends upwardly over a pulley 40 which is rotatably mounted on a horizontal axis on a support 41 secured to the rear side of the channel iron member 23. The cable passes over the upper side of the pulley 40 and extends downwardly and is securely attached at its opposite end to an anchor rod 42 weldably, or otherwise secured, to the channel 35 on the bottom 13. Thus on vacuum actuation of the actuators 25, the cable 30 is responsively tightened or slackened so that the compression plate 14 is adjustably spaced relative to the bottom 13 by the cable passing over the pulleys 32 and 40, acting as a block and tackle, and giving the actuators a desirable mechanical advantage over the bale case extension in imparting precise bale resistance characteristics thereto.

The pair of actuators 24 are operated simultaneously and correspondingly by providing a cross conduit 45 communicating with both of the upper portions thereof. An air hose 46 communicates with cross conduit 45 at one end and at its other end is connected to an accumulator 47 for a source of vacuum or air at reduced pressure. A pressure regulating valve 48 is connected along the air hose 46 for the regulation of air at reduced pressure therethrough. The accumulator is connected to a source of vacuum or air at reduced pressure, not shown, such as to the intake manifold of the engine which operates the baler or the engine of the tractor used for drawing the baler.

Means is provided for adjustably supporting the pressure regulating valve 48 in the form of a strap metal, irregularly shaped, bracket 52 which is bolted or otherwise secured to the side of the bale case 11, ahead of the position therein where the bales are tied. The pressure regulating valve is adjustably supported on the bracket 52 by providing a screw 53 attached to a portion of the housing of the valve 48 and threadedly extended through the bracket 52. A regulating lever 54 is threadedly received over the outer end of the screw 53 and engages the outer surface of the bracket 52 to maintain the housing of the pressure regulating valve in adjustably mounted position.

A valve rod 58 is slidably extended from the pressure regulating valve 48 and serves by its longitudinal positioning to regulate the reduction of air pressure in the hose 46 between the limits of atmospheric pressure and the reduced pressure in the accumulator 47.

Figure 3:
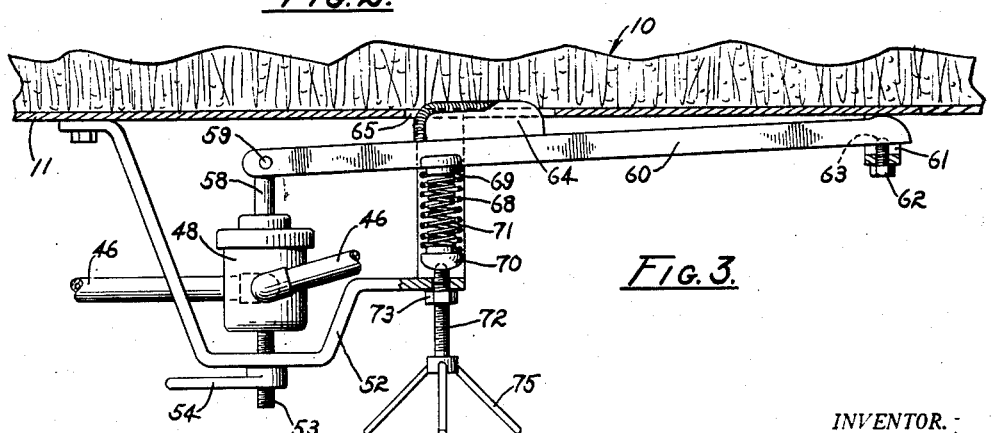
Fig. 3 is a somewhat enlarged fragmentary horizontal longitudinal sectional view through a portion of the baler, showing the valve actuating mechanism of the control of the present invention, as viewed from line 3—3 in Fig. 2, with a portion of a spring loading mechanism employed therein broken away for illustrative convenience.
Figures 4, 5:
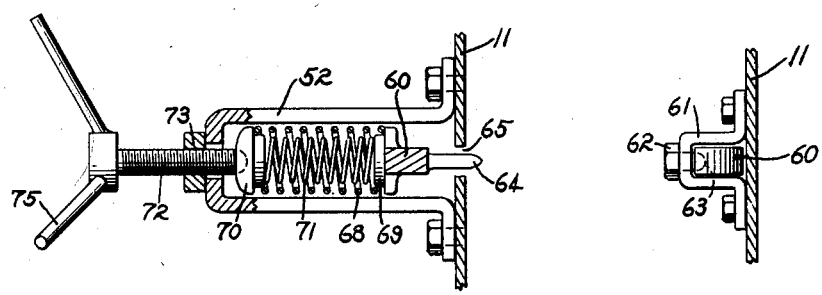
Fig. 4 is a further enlarged fragmentary vertical transverse sectional view through the bale case of the baler showing the tensioning means for the valve actuating mechanism, as taken along line 4—4 in Fig. 1.
Fig. 5 is a vertical transverse sectional view through a wall of the bale case showing the pivot means for the valve operating arm of the baler, as taken on line 5—5 in Fig. 2 of the drawing.
Figure 6:
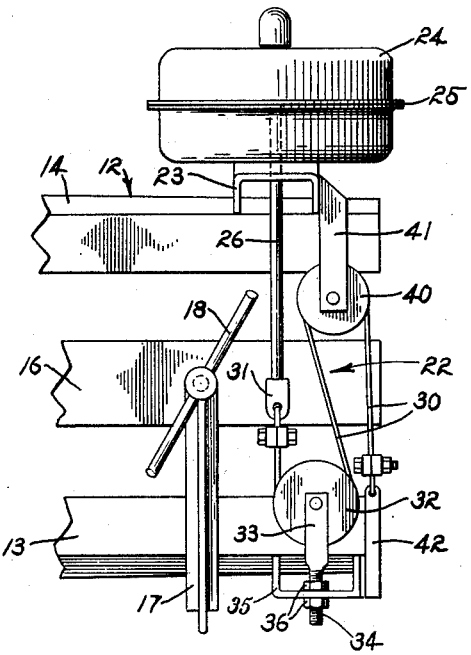
Fig. 6 is a fragmentary side elevational view of the outer terminal end of the bale case extension of the baler, illustrating the structure provided by the present invention to regulate compression plate position.
Figure 7:
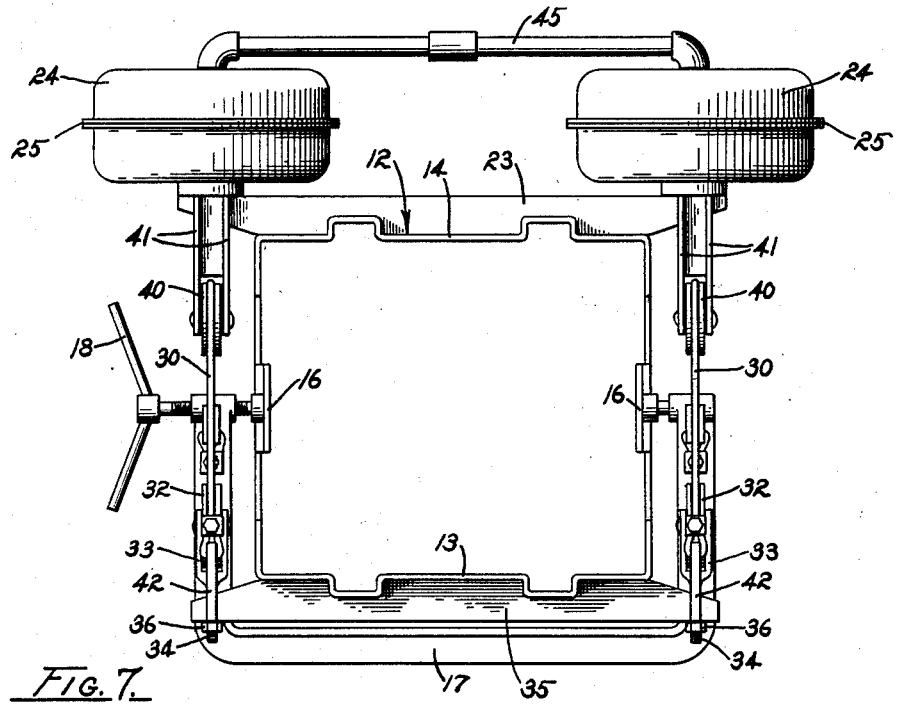
Fig. 7 is an end elevational view of the delivery end of the baling mechanism.
Figure 8:
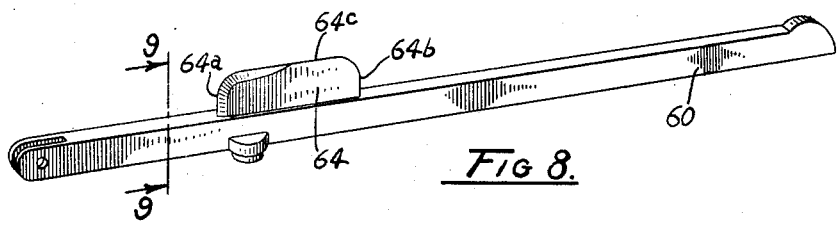
Fig. 8 is an enlarged perspective of a control arm having a blade thereon employed in the device of the present invention illustrative of a sharpened cutting edge of the blade.

The valve rod 58 is pivoted at 59 to an end of an elongated control arm 60 the details of which are best shown in Fig. 8, arranged longitudinally of the bale chamber, as shown in Fig. 3. The opposite end of the control arm is fulcrumed in a strap metal saddle 61 which is secured to the side of the bale case 11. A screw 62, as shown in Fig. 3, is threadedly received through an outer portion of the saddle 61 and provides an inner end which engages in a recess 63 in the control arm to restrain the arm against longitudinal movement but to permit ready pivotal movement toward and away from the bale chamber 11. A detector blade 54 is formed longitudinally of the rear side 60a of the control arm 60 and extends into the interior of the bale chamber 11 through an elongated longitudinally extending slot 65 formed through the side of the bale chamber. The blade is elongated longitudinally of the bale case and is relatively thin in its vertical dimension with the leading 64a and rearward 64b edges thereof rounded and the inner longitudinal edge 64c thereof formed in a rounded somewhat pointed edge. The blade extends into the hay being compressed in the bale chamber 11 at a position intermediate the ramming and tieing stations and provides continuous compression detection.

Figure 9:
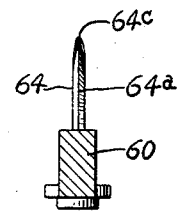
Fig. 9 is a section taken on line 9—9 of Fig. 8.
Figure 10:
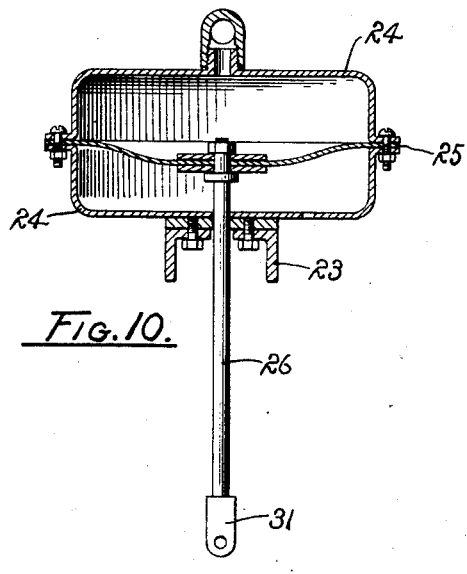
Fig. 10 is a section taken on line 10—10 of Fig. 1.

In some instances it has been found that the detector blade 64 moves upon each stroke of the compacting plunger in the bale chamber 11, periodically opening the control valve 48. This condition is readily overcome by sharpening the forward end portion 64a of the blade, as shown in Figs. 8 and 9, so that a portion of the encountered hay is cut on surges of hay incident to the reciprocation of the plunger. This sharpening is considered a useful feature of the blade structure.

The blade 64 is resiliently urged into the hay being compressed in the bale case 11, by a helical compression spring 68 which is located under adjustable initial compression between a locating boss 69 forwardly extended from the control arm 60 and a floating head 70. To provide further compressive resistance or force to move the blade 64 into the bale case, another smaller helical compression spring 71 is located under initial compression within the spring 68 between the boss 69 and the floating head 70. The pressure with which the springs urge the blade 64 into the bale case 11 is regulated by means of a screw 72, one end of which engages the floating head 70 and which is threadedly engaged in a nut 73 attached to the bracket 52. The outer end of the screw 72 may be provided with a spider handle 75 for convenience of manual adjustment.

*Operation*

The operation and utility of the present invention is believed to be apparent from the foregoing description and is briefly summarized at this point. In the operation of the baler, hay or straw is compressed by the conventional mechanism in the bale chamber 11 of the baler and is tied or bound while still in the bale case. After a bale is compressed and tied, it is moved into the bale chamber extension where it is restrained as a backing for the ramming formation of a succeeding bale. The resistance to movement incident to constriction of the stationary bottom 13 and the compression plate 14 against the sides of a completed bale determines the density of the bale being compressed and subsequently tied within the bale case 11 adjacent the bale case extension. The greater the resistive force to movement of the formed bale, the greater is the compression and density of the bale being formed in the bale case. Conversely, the less the resistance to movement of the completed bale of hay or straw between the stationary bottom and the compression plate, the less dense or less compressed will be the bale being formed and tied within the bale case. The baling control of the present invention provides means for automatically regulating the spacing or compressive resistance to movement of formed bales therebetween.

It is to be observed that the blade 64 is urged into the bale chamber 11 intermediate the limit of compressive movement of the bale ram, not shown, and the tieing station with a resilient force predetermined by adjustment of the screw 72. It is well known that as hay is baled, the individual stalks after the ramming operation are substantially erectly positioned in the bale chamber. Thus the blade 64, because of its length, at all times rides against a multiplicity of stalks or stems and thus provides an accurate index of hay compression. Variations in the compactness of the hay occur in relatively closely spaced positions longitudinally of the bale chamber and thus the elongated blade has an averaging advantage in compression detection. The screw 73 is adjusted to urge the blade 64 or the panel 80a, into the bale chamber to any predetermined depth achieving dependable detection. In operable structures this frequency is from one-quarter to one-half inches in depth of hay engagement.

The regulating lever 54 is turned to position the valve 48 to achieve the desired operation. The valve is preferably positioned so that when the blade 64 is forced out of the bale chamber by riding over excessively compressed hay, the upper portions of the actuators 24 are subjected to substantially atmospheric pressure so that a minimum of resistance to distention of the bottom 13 and compression plate 14 results. When the valve is so positioned, the sinking of the blade 64, into compressed hay in the bale chamber to an excessive depth under spring pressure, results in the evacuating of air from the upper portion of the actuators 24 so that atmospheric pressure operating on the diaphragm 25 through the lower portions of the actuators exerts a maximum constricting force on the bottom 13 and compression plate 14. Any suitable valve 48 may be employed but preferably is of a structure providing intermediate regulatory effects between the maximums described.

When due to faulty basic adjustment of the baling apparatus, excessively heavy or damp hay, or other factors, the hay is compressed in the bale chamber 11 to a degree greater than desired, the blade 64 automatically regulates the valve 48 and through relaxation of constricting forces of the bottom 13 and compression plate 14 permits the previously formed bale to move more readily from the bale chamber extension 12 and thus automatically reduces the degree with which hay is compacted thereagainst in the bale chamber. It is emphasized that this adjustment occurs during bale formation so that immediate corrective measures are automatically taken in order to achieve bales of substantially equal compactness and weight. Conversely, when the hay is insufficiently compacted, the valve 48 automatically controls the actuators 24 to constrict compression plate 14 relative to the bottom 13 impeding movement of the previously formed bale and assuring increased compression of hay compacted into the bale.

From the foregoing description of the invention and the operation thereof it will be seen that bales of uniform density may be obtained by the use and operation of the baling control of the present invention. The constant attention of an operator to adjust the resistance against movement of the completed bale of hay is obviated by the present invention resulting in economy in the harvesting or baling of hay and the like and the achieving of bales of greater uniformity of density and weight of obvious stacking, handling, loading and other advantages.

The device of the present invention has been found to be fully automatic and thoroughly dependable in controlling baling operations under even the most widely varied baling conditions. It is economical to produce and readily installed as an attachment on various types of existing baling apparatus as well as being suited to incorporation in newly produced baling apparatus.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and structures.

Having described my invention, what I claim as new and desire to secure by Letters Patent is:

1. An automatic density control for hay presses having an elongated bale chamber in which hay is compacted at one end and through which hay is forced for discharge in bale form from the opposite end, the discharge end of the bale chamber being provided with means controllably resisting the forcing of hay in bale form therethrough, comprising an elongated blade mounted longitudinally of the direction of hay movement through the chamber for reciprocal movement into and from the chamber and having a laterally disposed longitudinal edge extended into the bale chamber in the direction of movement of the blade into the chamber at a position adjacent to which hay is compacted in the chamber, a bracket mounted on the bale chamber in spanning relation to the blade, an adjustment screw mounted in the bracket and providing a floating head in adjustable spaced relation to the blade, a compression spring mounted between the floating head and the blade, and means interconnecting the blade and the hay resisting means at the discharge end of the bale chamber for controllably resisting hay movement in response to movement of the blade to and from the chamber.

2. An automatic density control for hay presses having an elongated bale chamber in which hay is compacted at one end and through which hay is forced for discharge in bale form from the opposite end, the discharge end of the bale chamber being provided with means controllably resisting the forcing of hay in bale form therethrough, comprising an elongated blade mounted longitudinally of the direction of hay movement through the chamber for reciprocal movement to and from the chamber and having a longitudinal edge extended into the bale chamber at a position adjacent to which hay is compacted in the chamber, said blade having a sharpened hay-cutting edge disposed within the chamber in the direction from which hay is forced through the chamber, resilient means urging the blade into the chamber, and means interconnecting the blade and the hay resisting means at the discharge end of the bale chamber for controllably resisting hay movement in response to movement of the blade to and from the chamber.

3. In an automatic density control for hay presses having an elongated bale chamber in which hay is compacted at one end and through which the hay is forced for discharge in baled form from the opposite end, said discharge end of the bale chamber being constrictable and distensible to vary the cross-sectional area thereof, an elongated control arm pivotally mounted longitudinally of the bale chamber for movement to and from the chamber, an elongated blade mounted longitudinally on the control arm and having a longitudinal edge extended into the bale chamber at a position adjacent to which the hay is compacted in the chamber, said blade having a sharpened hay-cutting edge disposed within the chamber in the direction from which hay is forced through the chamber, resilient means urging the arm and the blade inwardly of the chamber, and means operably connected to the control arm having controlling connection to the discharge end of the bale chamber for varying cross-sectional area of the bale chamber in response to movement of the control arm and blade to and from the bale chamber.

4. In an automatic density control for hay presses having an elongated bale chamber in which hay is compacted at one end and through which the hay is forced for discharge in baled form from the opposite end, an elongated control arm pivotally mounted longitudinally of the bale chamber for movement to and from the chamber and having an end extended externally adjacent to the compacting end of the chamber, an elongated blade mounted longitudinally on the control arm and having a longitudinal edge extended into the bale chamber at a position adjacent to which the hay is compacted in the chamber, said blade having a sharpened hay-cutting edge disposed within the chamber in the direction from which hay is forced through the chamber, resilient means urging the arm and the blade inwardly of the chamber, a bracket mounted on the bale chamber in arched relation over the extended end of the control arm, a regulating valve connected to the extended end of the control arm and to the bracket opposite the bale chamber from the control arm, said valve being adjustably positioned on the bracket in spaced relation to the bale chamber, and a control system including the valve connected to the discharge end of the bale chamber and varying the cross-sectional area of the bale chamber in response to pivotal movement of the control arm.

5. In a hay baler having an elongated bale chamber in which hay is compacted at one end and through which the hay is forced for discharge in baled form from the opposite end, the discharge end of the bale chamber being constrictable to resist bale movement therethrough, the combination of an elongated control arm pivotally mounted longitudinally of the bale chamber for movement to and from the chamber, an elongated blade mounted longitudinally on the control arm and having a longitudinal edge extended into the bale chamber, adjustable resilient means mounted on the bale chamber urging the arm and the blade inwardly of the chamber, a vacuum accumulator adapted for connection to the manifold of an internal combustion engine, a pressure regulating vacuum valve connected to the accumulator and connected to the control arm, means mounting the regulating valve on the bale chamber in adjustable spaced relation to the bale chamber opposite the control arm therefore, and a vacuum actuator having a closed chamber divided by a diaphragm, the actuator at one side of the diaphragm being connected to the regulating valve and at the other side of the diaphragm being open to the atmosphere, and means providing a mechanical advantage connecting the diaphragm in constriction controlling relation to the discharge end of the bale chamber.

6. In an automatic density control for hay presses having an elongated bale chamber in which hay is compacted at one end and through which hay is forced for discharge in bale form from the opposite end, a compression detection member comprising an elongated blade mounted on the chamber longitudinally of the direction of hay movement through the chamber for pivotal movement about an axis substantially right angularly related to said direction of hay movement, said blade having an elongated sharpened hay-cutting edge longitudinal of the blade disposed therefrom in the direction of movement of the blade into the chamber and in the direction from which hay is forced through the chamber, and means yieldably urging the blade into the chamber, said sharpened edge adapted to cut encountered hay to prevent periodic movements of the blade each time hay is compacted in the chamber.

7. In an automatic density control for hay presses having an elongated bale chamber in which hay is compacted at one end and through which hay is forced for discharge in bale form from the opposite end, a compression detection member comprising an elongated blade mounted on the chamber longitudinally of the direction of hay movement through the chamber for pivotal movement into and from the chamber in a predetermined plane about an axis substantially right angularly related to said direction of hay movement, the blade being substantially flat in the plane of pivotal movement thereof and having a thin longitudinal edge laterally disposed therefrom in the direction of movement of the blade into the chamber, said laterally disposed longitudinal edge having an end disposed in the direction from which hay is forced through the chamber sharpened for hay-cutting purposes and means yieldably urging the blade into the chamber, the sharpened end adapted to cut hay encountered thereby to prevent periodic movement of the blade in said predetermined plane in response to periodic surges of hay.

References Cited in the file of this patent

UNITED STATES PATENTS

| | | |
|---|---|---|
| 745,862 | Kerr | Dec. 1, 1903 |
| 1,403,290 | Catching | Jan. 10, 1922 |
| 2,396,720 | Nolt | Mar. 19, 1946 |
| 2,478,012 | Raney | Aug. 2, 1949 |
| 2,613,590 | Graybill | Oct. 14, 1952 |